(12) United States Patent
Bengtsson et al.

(10) Patent No.: US 6,865,191 B1
(45) Date of Patent: Mar. 8, 2005

(54) SYSTEM AND METHOD FOR SENDING MULTIMEDIA ATTACHMENTS TO TEXT MESSAGES IN RADIOCOMMUNICATION SYSTEMS

(75) Inventors: Henrik Bengtsson, Lund (SE); Ivan Medved, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 623 days.

(21) Appl. No.: 09/630,624

(22) Filed: Aug. 3, 2000

Related U.S. Application Data

(60) Provisional application No. 60/148,214, filed on Aug. 12, 1999.

(51) Int. Cl.[7] .................................................. H04J 3/24
(52) U.S. Cl. ...................................... 370/475; 455/466
(58) Field of Search ................................. 370/310, 328, 370/345–7, 469, 465, 474–6; 455/403, 412–5, 422, 426, 556, 561, 466

(56) References Cited

U.S. PATENT DOCUMENTS

| | | | |
|---|---|---|---|
| 5,781,901 A | | 7/1998 | Kuzma |
| 6,223,291 B1 | * | 4/2001 | Puhl et al. .................. 713/201 |
| 6,397,261 B1 | * | 5/2002 | Eldridge et al. ............ 713/171 |
| 6,549,612 B2 | * | 4/2003 | Gifford et al. ............. 379/67.1 |
| 6,574,599 B1 | * | 6/2003 | Lim et al. .................... 704/270 |
| 6,704,394 B1 | * | 3/2004 | Kambhatla et al. ........ 379/67.1 |
| 6,754,181 B1 | * | 6/2004 | Elliott et al. ................ 370/252 |

FOREIGN PATENT DOCUMENTS

| | | |
|---|---|---|
| WO | WO97/08908 | 3/1997 |
| WO | WO98/58332 | 12/1998 |

\* cited by examiner

*Primary Examiner*—David Vincent
(74) *Attorney, Agent, or Firm*—Potomac Patent Group, PLLC

(57) ABSTRACT

Methods and systems for transmitting attachments to text messages without turning terminals into e-mail clients are described. When an attachment is to be transmitted, an address of an attachment server is appended to the text message. The text message is then forwarded to the intended recipient, e.g., via an SMS server, while the attachment is sent to the attachment server. Upon receipt of the text message, the recipient can then download the attachment from the attachment server using the address included in the text message.

20 Claims, 5 Drawing Sheets

SYSTEM AND METHOD FOR SENDING MULTIMEDIA ATTACHMENTS TO TEXT MESSAGES IN RADIOCOMMUNICATION SYSTEMS

PRIORITY APPLICATION

This application claims priority from U.S. Provisional Patent Application Ser. No. 60/148,214, filed on Aug. 12, 1999, having the same title, the disclosure of which is incorporated here by reference.

BACKGROUND

The present invention generally relates to radiocommunication systems and methods for signalling in radiocommunication systems and, more particularly, to systems and methods for communicating multimedia attachments to short text messages in radiocommunication systems.

The GSM describes a European standard for radiocommunication and the corresponding Public Land Mobile Network (PLMN) which is intended to provide uniformity so that users can access radiocommunication systems throughout Europe with minimal equipment compatibility problems. The GSM includes many services for subscribers, including a message function service called the Short Message Service (SMS) which provides for the transmission of messages having up to 160 alphanumeric characters to be sent to a subscriber at his or her mobile unit.

Unlike voice or data connections supported in radiocommunication systems, SMS messages are typically transmitted as overhead signalling, e.g., as part of the information provided on control channels. Thus, SMS service is more similar in many ways to conventional paging functions than to wireless voice or data connections, but also has several differences. For example, if a phone is switched off, or otherwise unreachable, the SMS message is stored and can later be sent to the designated subscriber when that subscriber is reconnected to the system. The SMS message originates from either a mobile unit, which transmits the SMS message to a service center, or from a user external to the radiocommunication system, e.g., by calling an operator at a service center who enters the SMS message into the radiocommunication system.

When an SMS message is delivered from a service center to a mobile unit, regardless of how it originates, such a message is conventionally referred to as a "mobile terminated short message" (MTSM). If an SMS message originates at a mobile unit, the signal to the service center requesting forwarding of the SMS message is conventionally referred to as a "mobile originated short message" (MOSM). The conventional protocol for transmission of MTSMs is well established in the GSM, for example in the document entitled "GSM 09.02-Version 2" published in June 1992 which is incorporated here by reference and is described in more detail below with respect to FIG. 1.

Therein, an originating mobile station (MS-A) 2 sends an MOSM to the mobile switching center (MSC) 4 supporting the geographical area which the mobile station is currently visiting. Not shown explicitly in FIG. 1, but as will be apparent to those skilled in the art, is the base station which receives the signal from the mobile station 2 and forwards same to the MSC 4. The MSC 4 forwards the MOSM to interworking mobile switching center (IWMSC) 6 using an address of the service center assigned to, mobile station 2 as part of the overhead information associated with the MOSM.

The IWMSC provides centralized interfacing functionality for SMS messaging. For MOSMs, the IWMSC 6 operates to transfer short messages to an identified service center (SC). The IWMSC also functions to transfer results associated with SMS message transmission back to the MSC. Thus, in this example, IWMSC 6 forwards the MOSM to SC-A 8. SC-A 8 acknowledges receipt of the MOSM back to IWMSC 6, which in turn forwards an acknowledgement back to MSC 4.

Service centers are "store and forward" devices which are logically outside of the mobile radio network. SCs operate to receive and store SMS messages, deliver SMS messages to mobile stations (or receivers outside of the mobile network) and, optionally, customize delivery of SMS messages according to service profiles stored at the SC. In the current example, SC-A 8 receives the MOSM from the IWMSC 6 and, assuming for the sake of this example that the subscriber associated with MS-A has a service profile stored at SC-A 8, performs one or more operations to the MOSM in accordance with the service profile. These operations may include, for example, copying the received SMS message and storing same, sending the SMS message according to a distribution list defined by subscriber A, or converting the SMS message to a desired delivery media (e.g., a fax). After performing whatever operations are indicated by the service profile, SC-A 8 then sends the MOSM as an MTSM to the recipient identified in the MOSM. This occurs as follows.

The MTSM is first sent to an SMS-gateway mobile switching center (GMSC) 10. Like its counterpart the IWMSC, the GMSC acts as a port into the mobile radio network. Before the GMSC 10 can deliver the SMS message through the chain of nodes to the base station (not shown) which is serving the recipient's mobile station, the GMSC 10 must first determine the location of the recipient's mobile station (i.e., which MSC is currently serving that mobile station). Thus, GMSC 10 first interrogates the recipient's home location register (HLR) 12 to obtain routing information for the message.

HLRs store data relating to subscribers including, for example, current location of the subscribers' equipment, directory number (MSISDN), radio number plan identification (e.g., International Mobile Subscriber Identity (IMSI)), supplementary service profiles and teleservice profiles. For MTSMs, HLRs provide (upon request) the identity of the visited MSC associated with a recipient of the SMS message, as well as information relating to whether the mobile station can receive the message (e.g., whether the subscriber is barred from receiving MTSMs). In the current example, to interrogate the HLR 12, a GSM MAP message called "Send Routing Information for Short Message" is sent by the GMSC 10 to the HLR 12. The appropriate HLR for interrogation can be determined using the recipient's MSISDN, e.g., by translating the MSISDN into a CCITT No. 7 address.

After receiving the routing information, e.g., the visited MSC number and IMSI, from HLR 12, the GMSC 10 forwards the message to the visited MSC/VLR 14 which is currently serving the recipient's mobile station MS-B 16. Note that for purposes of simplicity the visitor location register (VLR) has been illustrated in FIG. 1 as being integrated with the mobile switching center, although in practice these two nodes can be physically separated. The VLR manages data associated with subscribers which are currently situated within its area of responsibility, e.g., those which have roamed into the service area of that VLR, the VLR being updated with information from a subscriber's home location register. With respect to handling SMS messages, the VLR also stores an indication if a mobile station is unreachable for delivery of a particular MTSM. The VLR notifies the HLR when a mobile station can later be reached to deliver the MTSM.

With the advent of the Internet, e-mail having multimedia attachments is a service that is growing in popularity with consumers. Today, although the SMS techniques described above provide functionality which is comparable to the text messaging attribute of e-mail, there exists no mechanism which would permit transmission or reception of an attached file, e.g., image files or audio files, by a remote, wireless terminal.

One solution to this problem would be to implement e-mail client software in each remote, wireless terminal, so that these devices could be used to send and receive e-mail much like a computer terminal. However, this would require adaptation of the air interface (i.e., the standardized interfaces which specify how information is transmitted between a base station and a mobile station in radiocommunication systems) and other additional complexity. Moreover, there are today many different e-mail standards, e.g., IMAP4 and POP3, each of which would require support to provide a similar type of service in the wireless environment.

From the foregoing, it is apparent that it would be desirable to modify conventional techniques for delivering SMS messages to provide an opportunity for attaching files, e.g., image, audio, etc., thereto. However, for the various reasons discussed above, it would be also desirable to provide this capability without introducing the complexity of turning wireless communication devices into e-mail clients per se.

SUMMARY

According to exemplary embodiments of the present invention, these and other drawbacks, problems and limitations of conventional radiocommunication systems are overcome by providing methods and mechanisms for transmitting attachments to text messages without turning terminals into e-mail clients. When an attachment is to be transmitted, an address of an attachment server is appended to the text message. The text message is then forwarded to the intended recipient, e.g., via an SMS server, while the attachment is sent to the attachment server. Upon receipt of the text message, the recipient can then download the attachment from the attachment server using the address included in the text message.

BRIEF DESCRIPTION OF THE DRAWINGS

The foregoing objects, features and advantages of the present invention will be more readily understood upon reading the following detailed description in conjunction with the drawings in which.

DETAILED DESCRIPTION

Figure 1:
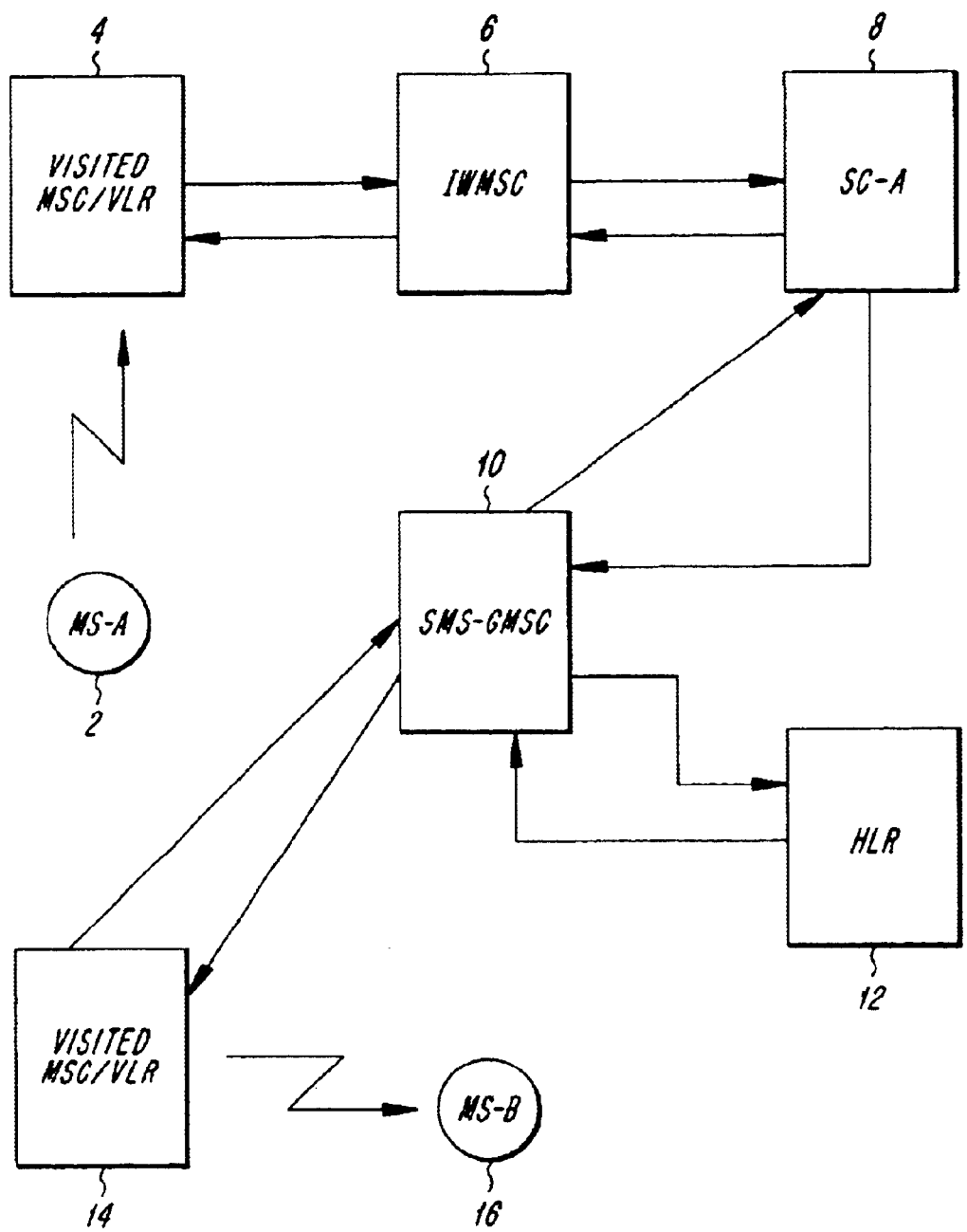
FIG. 1 illustrates a block diagram of entities involved in the routing of SMS messages.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed over a number of time slots. However, those skilled in the art will appreciate that the concepts disclosed herein find use in other protocols, including, but not limited to, frequency division multiple access (FDMA), code division multiple access (CDMA), or some hybrid of any of the above protocols. Likewise, some of the exemplary embodiments provide illustrative examples relating to the GSM system, however, the techniques described herein are equally applicable to radiocommunication systems operating in accordance with any specification.

According to an exemplary embodiment of the present invention, a camera device which is capable of generating image files is built into, or detachably associated with, a remote terminal in the radiocommunication system, e.g., a cellular phone in a UMTS system. This camera can take a still image, or possibly also a video sequence, and send it to the remote terminal for storage in a memory device. The specific implementation by which the camera device is associated with the terminal is beyond the scope of this discussion as any implementation can be used in conjunction with the present invention. However, as an example, the interested reader is referred to U.S. Pat. No. 5,806,005, entitled "Wireless Image Transfer from a Digital Still Video Camera To A Networked Computer", the disclosure of which is incorporated here by reference. The digital camera can be added as a completely separate unit, i.e., containing all of the processing, compression, view finding and display functionality and simply using the terminal as a modem to transmit the captured image as a compressed, attachment file. Alternatively, the camera can be a small module which is snapped onto the terminal, wherein the snap-on module contains an image sensor and processor, but which transfers uncompressed data to the terminal for viewing and compression. Yet another option is to provide the camera module with the image/video compression functionality, in addition to the image sensor and processor, so that compressed data is transmitted to the terminal. In addition to, or as an alternative to, the camera, an audio recorder for recording audio, voice, music, or any kind of sounds, may be provided to the terminal and used to capture and send audio information to the terminal for storage.

The terminal may display the captured image on the terminal's screen or output the audio file through a speaker or earphone. However, it would also be desirable to send this file, e.g., image or audio, to another terminal in the radiocommunication system or to a terminal outside of the radiocommunication system, e.g., a computer. As mentioned above, conventional radiocommunication systems do not provide any method or mechanism for sending images or files addressed directly to another terminal, but only support text messaging via SMS. Moreover, there is no conventional way for a message creator to know whether the receiving terminal has the capability to handle received data which includes attached files, such as image or audio files.

Figure 2:
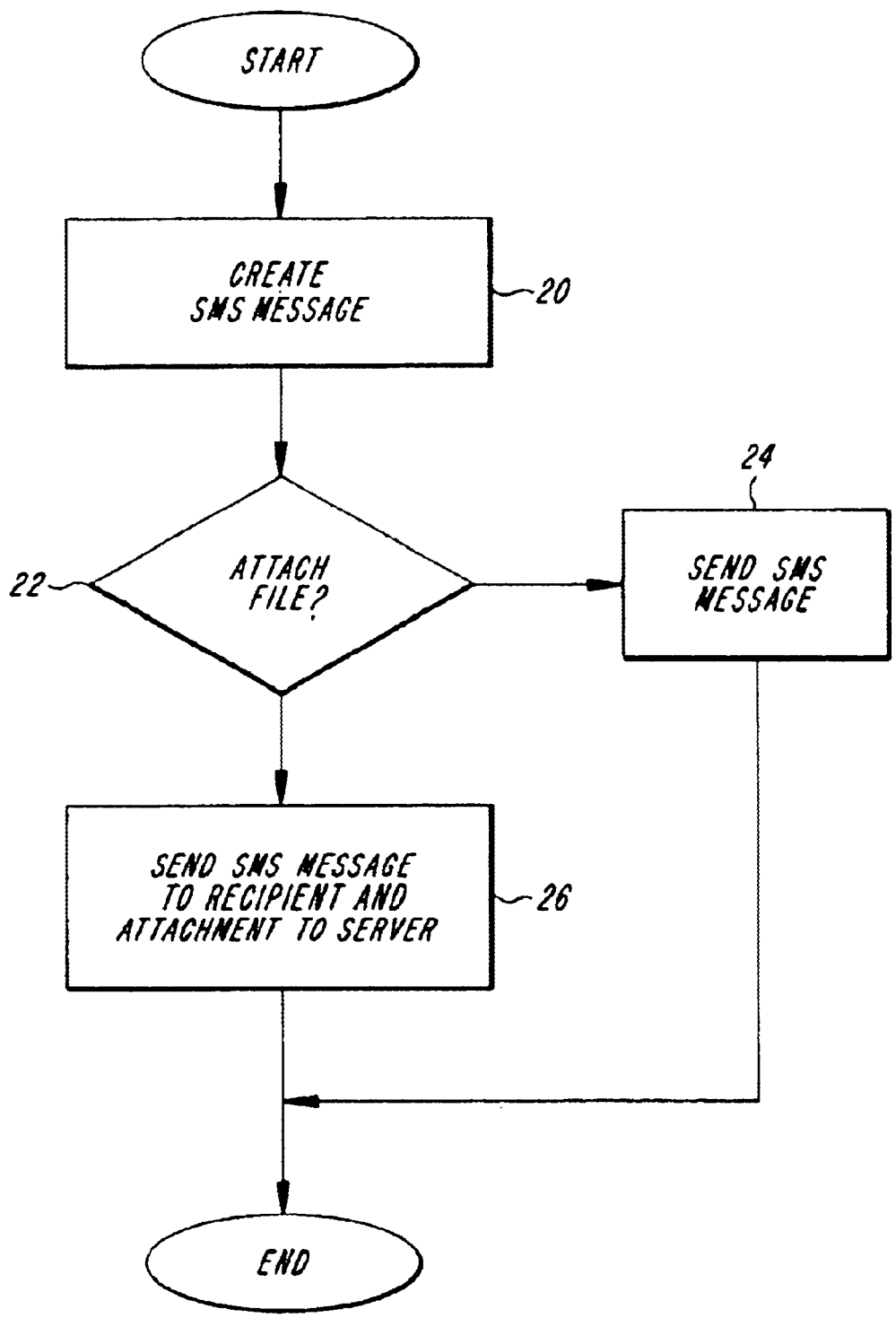
FIG. 2 is a flowchart illustrating a general method for transmitting messages with attachments according to the present invention.

According to exemplary embodiments of the present invention, an advanced messaging application provides the capability to attach such files to an SMS message for routing within the radiocommunication system. For example, with reference to the exemplary method of FIG. 2, consider that a user first creates a conventional SMS message in his or her terminal at step 20. Then, before the user sends the SMS message, the terminal can ask the user whether an attachment file should be included at step 22. Alternatively, a menu selection item or keypad stroke combination may be invoked by the user (without prompting) to add the attachment. If the user opts not to attach a file to the SMS message, then the SMS message is transmitted conventionally at step 24, i.e., in the manner described above with respect to FIG. 1. Otherwise, as indicated generally at step 26, certain information is added to the SMS message, which is forwarded to the intended recipient, and the attachment is sent to a special server for retrieval by the recipient of the SMS message.

Figure 3:
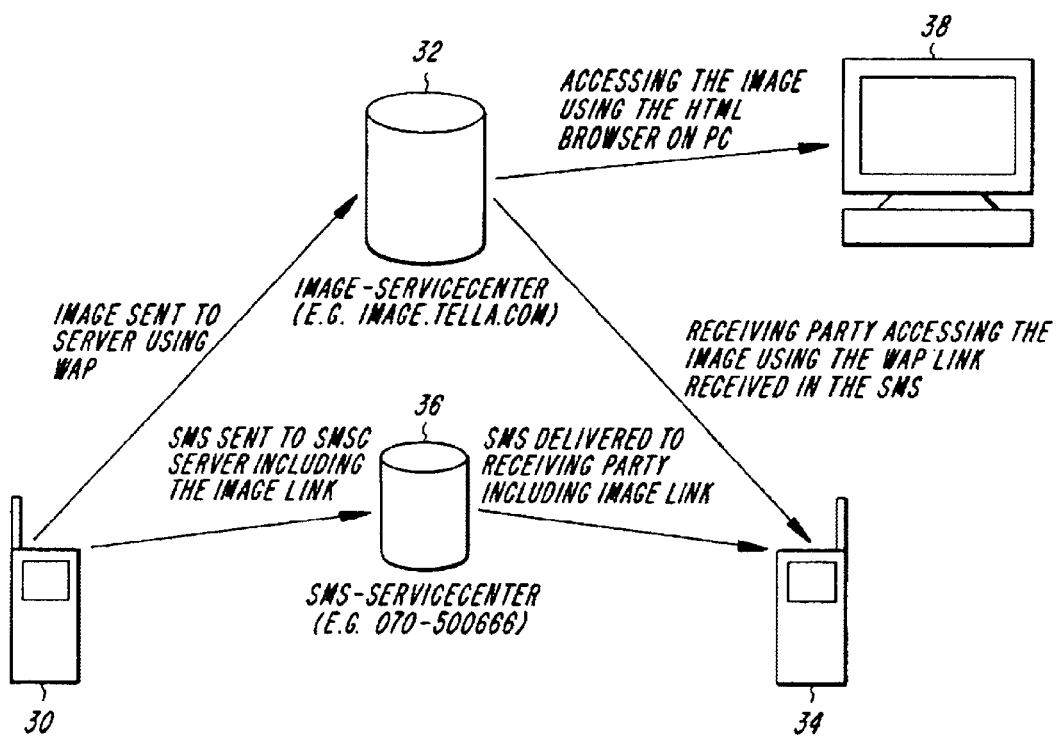
FIG. 3 illustrates a node map used to describe the routing of SMS messages and attachments according to an exemplary embodiment of the present invention.

FIG. 3 illustrates how the SMS message and its attachment are routed according to an exemplary embodiment of the present invention. The terminal 30 sends the attached image from the terminal 30 to a server 32 located in the network, e.g., using Wireless Access Protocol (WAP) as a transport mechanism. Those skilled in the art will be familiar with WAP, however the interested reader can find more information about WAP at http://www.wapforum.com/, the disclosure of which is incorporated here by reference. Note that according to this exemplary embodiment, the attachment is not sent straight to the receiving party 34. The text portion of the SMS message is sent to the receiving party 34 via an SMS server 36, e.g., as described above with respect to FIG. 1, but the attachment is transmitted to a different server 32. More specifically, the terminal 30 can have stored therein an address, e.g, a uniform resource location (URL) address, identifying the server 32 that the image is to be sent to.

This URL, e.g., image.telia.com, could be associated with a service that the operator provides to the user and, therefore, is only entered once into the terminal 30.

Figure 4A:
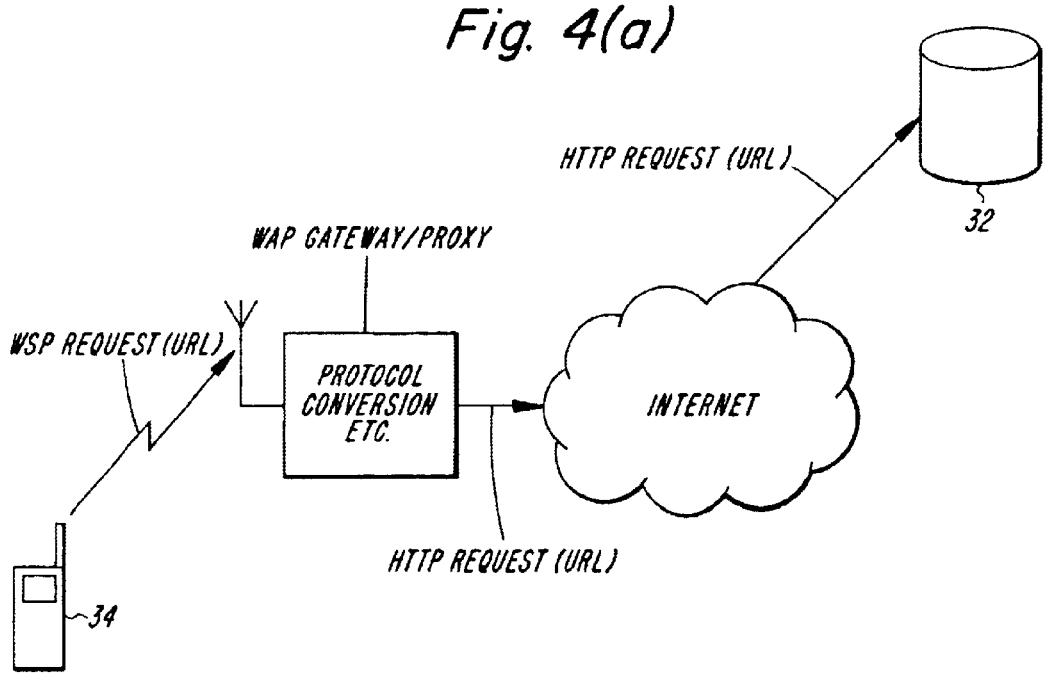
FIGS. 4(a) and 4(b) depict signalling between a receiving terminal and an attachment server according to an exemplary embodiment of the present invention.
Figure 4B:
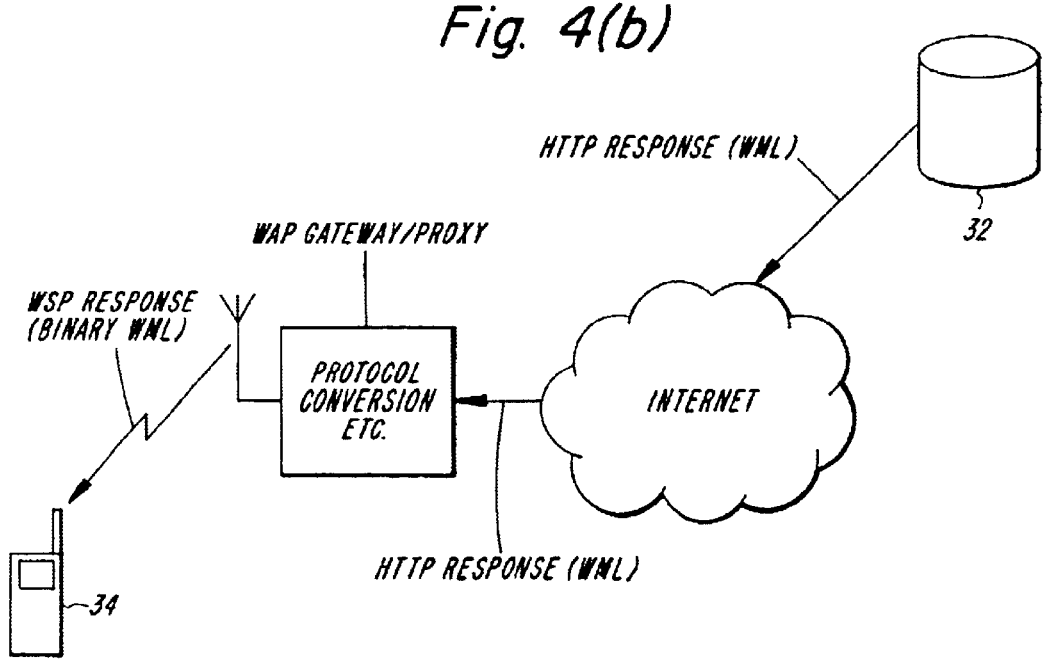
Figure 5:
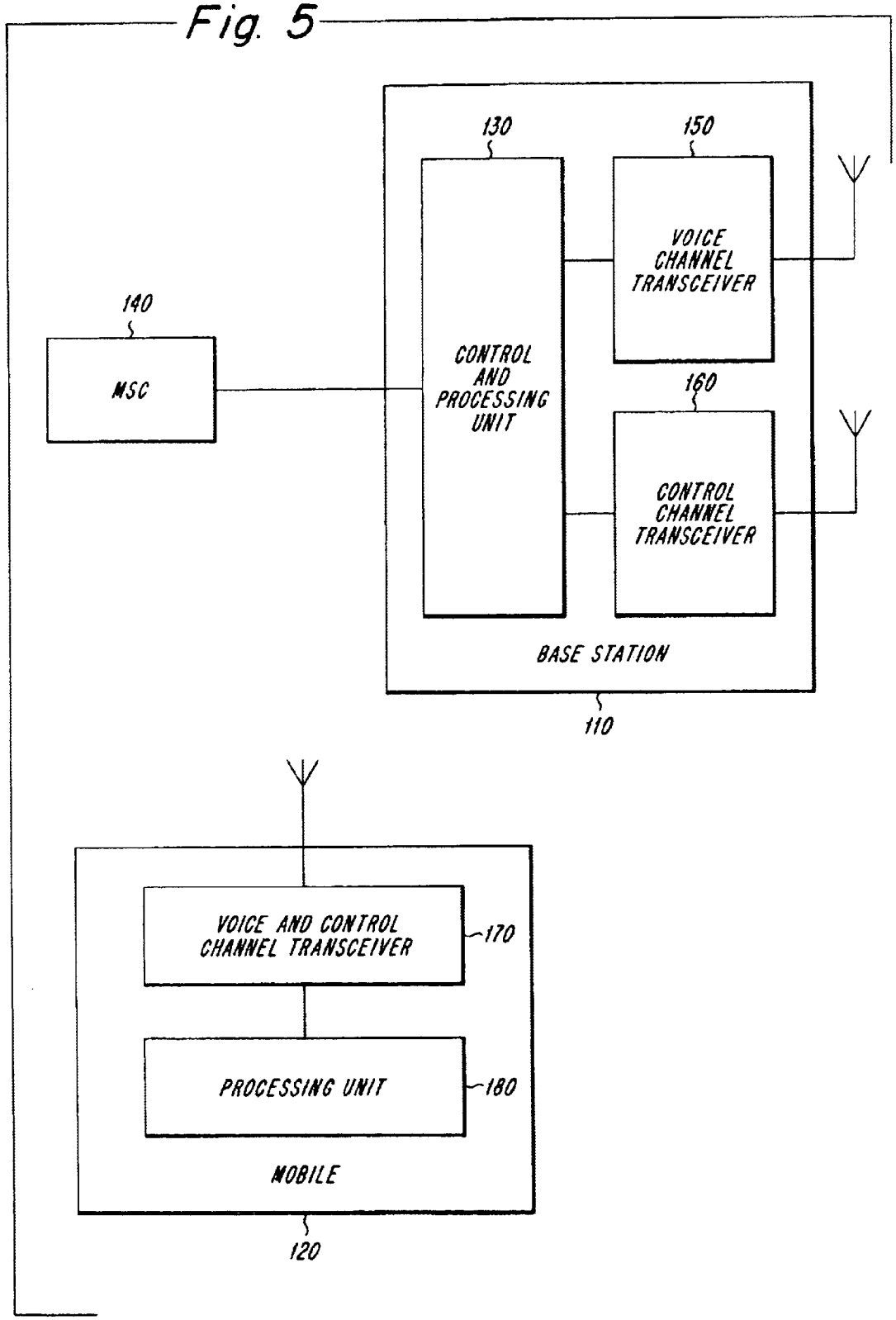
FIG. 5 is a block diagram of an exemplary cellular radiocommunication system in which the present invention can be implemented.

Those skilled in the art will appreciate that the server 32 may be part of the operator's network or, alternatively, can reside outside the operator's network, e.g., on the Internet. The terminal includes the URL address (e.g., image.telia.com/sending-phone-number/image-number) as part of the text that is sent to the receiving party 34 as an SMS message. Optionally, the terminal 30 may also include the file type (e.g., image, audio, etc.) of the attachment with the URL address in the SMS message. The receiving party 34 thus receives a message containing the text message, the link to the server 32 where the image (or other attached file) is stored and, optionally, a file type associated with the attachment. The receiving party may choose to download the image from server 32 using, e.g., WAP, to his or her terminal 34. This can be accomplished, for example, using the signalling illustrated in FIGS. 4(a) and 4(b).

Therein, the receiving terminal 34 sends, e.g., a Wireless Session Protocol (WSP) request with the URL to a WAP Gateway/Proxy 40, which provides protocol conversion, encoding/decoding, etc. of the signals transmitted therethrough. For example, the WAP Gateway/Proxy 40 can translate the WSP request to a HyperText Transfer Protocol (HTTP) request which is then sent over the Internet to the server 32. The server 32 then returns (FIG. 4(b)) an HTTP response, including a Wireless Markup Language (WML) coded attachment, to the WAP Gateway/Proxy 40. The WAP Gateway/Proxy 40 converts this messge into, for example, binary encoded WML to reduce the number of bits to be transmitted over the air interface back to the terminal 34.

If the terminal 34 doesn't support imaging, or more generally the file type that was attached, then the receiving party 34 could instead access the attachment using, for example, an HTML browser associated with a computer terminal 38 that has access to the server 32 over the Internet.

Thus, exemplary embodiments of the present invention solve the problem of handling attachments and providing a service that provides similar functionality to e-mail in radiocommunication systems, yet is less complex to implement. The number of configuration parameters can be kept to a minimum for the methods according to the present invention, as compared with what would be required for an e-mail application. For example, such configuration parameters can include the SMS service center number and the image server URL.

All terminals that support WAP and SMS, not limited to cellular technology, will be able to send and receive these kind of messages. However, since the foregoing exemplary embodiments have been described in the context of radiocommunication systems, FIG. 4 is provided herewith as a representation of an exemplary cellular mobile radiotelephone system in which the present invention can be implemented, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCHs and DTCs that share the same radio carrier frequency.

The mobile station 120 receives the information broadcast on a control channel at its voice and control channel transceiver 170. Then, the processing unit 175 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

While the sender of the SMS message and its attachment may be familiar with the capabilities of the recipient's terminal, this is not required. If, for example, the sender transmits an attachment that the receiver's terminal 34 does not have the capability to decipher and/or output, the WAP technology can negotiate with the server 32 to deliver the message in a format that is understood by the terminal 34. If the recipient doesn't have a WAP terminal, then the attached file could be accessed through the Internet as an ordinary HTML file.

While the present invention has been described using the foregoing exemplary embodiments, these embodiments are intended to be illustrative in all respects, rather than restrictive of the present invention. For example, although the term "mobile" has been used throughout this specification, the present invention can be applied to systems and methods wherein any type of remote equipment which supports the message service is originating or receiving the message, e.g., a portable unit, a personal digital assistant, a data terminal, etc.

Moreover, although the foregoing exemplary embodiments refer to messages which originate at "mobiles", those skilled in the art will also recognize that the present invention can also be applied where other types of equipment originate the message, e.g., PSTNs or data networks. Further, although the present invention has been exemplified by embodiments which refer to the GSM, the present invention is equally applicable to any system or standard (e.g., PDC or ADC). Thus, the scope of the present invention is instead set forth by the appended claims and encompasses any and all equivalents and modifications embraced thereby.

What is claimed is:

1. A method for transmitting a text message including an attachment thereto in a radio-communication system comprising:

associating, at a first terminal having a phone number associated with the radio-communication system, a text message with an attachment, the text message being addressed to a second terminal having a phone number associated with the radio-communication system, the addressing being based on the phone number of the second terminal;

sending the attachment to a server;

adding, at the first terminal, information to the text message that identifies the server;

transmitting the text message to the second terminal's phone number based address;

transmitting, by the second terminal, a message to the server identified in the text message, the message requesting the attachment; and receiving, at the second terminal, the attachment from the server.

2. The method of claim 1, wherein the method is reciprocal such that the method can also be carried out for attachments sent by the second terminal to the server and received at the first terminal from the server.

3. The method of claim 1, wherein said attachment is at least one of an image file and an audio file.

4. The method of claim 1, wherein transmitting the text message and receiving the attachment are performed using wireless access protocol (WAP).

5. The method of claim 1, wherein associating the text message comprises:

including, in the message, a file type associated with said attachment.

6. The method of claim 1, wherein the second terminal is a computer terminal.

7. The method of claim 1, wherein the second terminal is a cellular telephone.

8. The method of claim 1, wherein the text message is a short message service (SMS) message.

9. A radio-communication system for transmitting a text message including an attachment thereto, the radio-communication system comprising:

means for associating, at a first terminal having a phone number associated with the radio-communication system, a text message with an attachment, the text message being addressed to a second terminal having a phone number associated with the radio-communication system, the addressing being based on the phone number of the second terminal;

means for sending the attachment to a server;

means for adding, at the first terminal, information to the text message that identifies the server;

means for transmitting the text message to the second terminal's phone number based address;

means for transmitting, by the second terminal, a message to the server identified in the text message, the message requesting the attachment; and means for receiving, at the second terminal, the attachment from the server.

10. The system of claim 9, wherein the system further comprises:

means for associating, at the second terminal having a phone number associated with the radio-communication system, a text message with an attachment, the text message being addressed to the first terminal having a phone number associated with the radio-communication system, the addressing being based on the phone number of the first terminal;

means for sending the attachment to a server;

means for adding, at the second terminal, information to the text message that identifies the server;

means for transmitting the text message to the first terminal's phone number based address;

means for transmitting, by the first terminal, a message to the server identified in the text message, the message requesting the attachment; and means for receiving, at the first terminal, the attachment from the server.

11. The system of claim 9, wherein the attachment is at least one of an image file and an audio file.

12. The system of claim 9, wherein the means for transmitting a message and for receiving the attachment employ wireless access protocol (WAP).

13. The system of claim 9, wherein the means for associating the text message further comprises:

means for including, in the message, a file type associated with the attachment.

14. The system of claim 9, wherein the means for receiving the attachment includes a computer terminal.

15. The system of claim 9, wherein the means for receiving the attachment includes a cellular telephone.

16. The system of claim 9, wherein the text message is a short message service (SMS) message.

17. A mobile station comprising:

a processor for associating a text message with an attachment, the text message being addressed to a receiving terminal having a phone number associated with it, the addressing being based on the phone number of the receiving terminal, and for adding information to the text message that identifies a server; and a transceiver for sending the attachment to a server and for transmitting the text message to the receiving terminal's phone number based address.

18. The mobile station of claim 17, comprising a memory wherein the server identifying information is stored.

19. The mobile station of claim 17, wherein the server identifying information is a uniform resource locator (URL).

20. The mobile station of claim 17, further comprising:

means for querying a user of the mobile station regarding whether the attachment is to be transmitted with the text message.

* * * * *